United States Patent
Toshinaga et al.

[11] Patent Number: 6,066,192
[45] Date of Patent: May 23, 2000

[54] METHOD OF TREATING OR RECOVERING GASEOUS HYDROCARBON CONTAINED IN WASTE GAS

[75] Inventors: Kawai Toshinaga, Yokohama; Tahara Hiroshi, Kawasaki; Suzuki Kenithirou, Sayama, all of Japan

[73] Assignees: Cosmo Engineering Co., Ltd., Osaka; Idemitsu Engineering Co., Ltd., Tokyo, both of Japan

[21] Appl. No.: 09/077,874

[22] PCT Filed: Sep. 25, 1996

[86] PCT No.: PCT/JP96/02773

§ 371 Date: Jun. 8, 1998

§ 102(e) Date: Jun. 8, 1998

[87] PCT Pub. No.: WO97/20618

PCT Pub. Date: Jun. 12, 1997

[30] Foreign Application Priority Data

Dec. 6, 1995 [JP] Japan ..................... 7 317909
Apr. 9, 1996 [JP] Japan ..................... 8 86878

[51] Int. Cl.$^7$ ............................. B01D 53/047
[52] U.S. Cl. ................... 95/93; 95/99; 95/101; 95/114; 95/143; 95/146
[58] Field of Search ............ 95/92, 93, 101–106, 95/114, 115, 143–148; 96/130, 143, 144

[56] References Cited

U.S. PATENT DOCUMENTS

| | | | |
|---|---|---|---|
| 1,661,149 | 2/1928 | Barnebey | 95/106 |
| 1,934,075 | 11/1933 | Lewis | 95/143 X |
| 1,939,694 | 12/1933 | Hasche | 95/106 X |
| 2,642,153 | 6/1953 | Parks | 95/144 X |
| 3,103,425 | 9/1963 | Meyer | 95/115 |
| 3,768,232 | 10/1973 | Farber et al. | 95/106 |
| 4,046,525 | 9/1977 | Matsuo et al. | 95/147 |
| 4,087,260 | 5/1978 | Strathoff et al. | 95/143 |
| 4,165,972 | 8/1979 | Iles et al. | 95/115 X |
| 4,183,734 | 1/1980 | Leppard et al. | 95/115 X |
| 4,338,101 | 7/1982 | Tuttle | 95/146 X |
| 4,343,629 | 8/1982 | Dinsmore et al. | 95/146 X |
| 4,405,343 | 9/1983 | Othmer | 95/105 |
| 4,462,811 | 7/1984 | Dinsmore et al. | 95/146 X |
| 4,696,681 | 9/1987 | Lloyd-Williams | 95/115 |
| 5,154,735 | 10/1992 | Dinsmore et al. | 95/146 X |
| 5,187,131 | 2/1993 | Tiggelbeck et al. | 95/147 X |
| 5,294,246 | 3/1994 | Gardner, Sr. | 95/146 X |
| 5,398,513 | 3/1995 | Klobucar | 95/115 X |
| 5,453,112 | 9/1995 | Sinicropi et al. | 95/106 X |
| 5,542,965 | 8/1996 | Straubinger et al. | 95/143 X |
| 5,584,911 | 12/1996 | Menzenski | 95/101 X |
| 5,658,369 | 8/1997 | Kusay | 95/146 X |

FOREIGN PATENT DOCUMENTS

| | | | |
|---|---|---|---|
| 3020656 | 12/1981 | Germany | 95/143 |
| 57-42319 | 3/1982 | Japan . | |
| 7-284623 | 10/1995 | Japan . | |

*Primary Examiner*—Robert Spitzer
*Attorney, Agent, or Firm*—Oblon, Spivak, McClelland, Maier & Neustadt, P.C.

[57] ABSTRACT

A method of treating a gaseous hydrocarbon contained in waste gas by using adsorbent layers of single-tower or multi-tower configuration is characterized in that (1) double-cylinder type or multi-cylinder type adsorption apparatus, in which each adsorbent layer is indirectly cooled by cooling water, are employed as adsorption apparatus; (2) each adsorbent layer is a packed layer of one or more kinds of materials selected from activated carbon, synthetic zeolites and hydrophobic silica gel; (3) swing time required for switching between adsorption and desorption processes is set to 1 to 15 minutes; (4) each adsorbent layer is evacuated under vacuum while being purged by using part of clean gas evacuated from each adsorbent layer and/or air in the desorption process; and (5) the gaseous hydrocarbon is recovered from outflow purge gas. This method makes it possible to prevent abnormal temperature increase within each adsorbent layer and enhance the safety of the apparatus. It also makes it possible to decrease the residual gaseous hydrocarbon content of the waste gas released into the atmosphere down to 1 vol % or less.

8 Claims, 3 Drawing Sheets

METHOD OF TREATING OR RECOVERING GASEOUS HYDROCARBON CONTAINED IN WASTE GAS

TECHNICAL FIELD

The present invention relates to methods of easily and effectively recovering gaseous hydrocarbons from waste gases containing the gaseous hydrocarbons.

The invention pertains also to methods of treating gaseous hydrocarbons contained in waste gases in order that the waste gases can be released after reducing the concentration density of gaseous hydrocarbons, one of substances causing photochemical smog, to 1 vol % or less.

BACKGROUND ART

The density of gaseous hydrocarbons, one of substances causing photochemical smog, that are released into the atmosphere is strictly regulated by law not only in such advanced countries as the United States, European countries and Japan but also in Taiwan, Mexico, China, and so forth.

Although specific levels of regulatory standards vary depending on the situation of each country, the advanced countries, except for Japan, adopt the criterion of 1 vol % or less (38 mg/l or less) set by the United States Environmental Protection Agency (EPA). Among them, the United States and European countries strictly comply with this criterion. A recent trend has been to make the regulatory standards even more stringent.

Waste gases which are released when landing volatile hydrocarbons for storage or when loading or unloading them during transportation is a matter of particular concern as a source of gaseous hydrocarbons. This concern involves tank trucks, railroad freight cars, storage tanks and tankers engaged in domestic trade, for example.

Widely known conventional techniques for treating and recovering such waste gases containing gaseous hydrocarbons include:

(1) Absorption method (normal pressure absorption and reduced pressure recovery method) based on the use of a nonvolatile hydrocarbon solvent;

(2) Membrane gas separation method based on the use of a gas separating membrane;

(3) Low temperature processing method in which waste gas is cooled to an extremely low temperature; and (4) Adsorption method based on the use of activated carbon or zeolite.

Among the aforementioned methods (1)–(4), an example of the absorption method (1) is disclosed in Japanese Examined Patent Publication No. 54-8632, in which waste gas is passed through, or washed out with, a nonvolatile hydrocarbon solvent, causing volatile hydrocarbons contained in the waste gas to be dissolved, and remaining air which is insoluble in the solvent is released into the atmosphere. The solvent containing the volatile hydrocarbons is then flashed in a vacuum vessel to separate volatile hydrocarbon vapor and the nonvolatile hydrocarbon solvent from each other. In this method, the separated volatile hydrocarbons are recovered by washing them with a hydrocarbon liquid of the same properties while the nonvolatile hydrocarbon solvent also recovered in the separation process is recycled for further use. This method is most widely used in Japan.

The method mostly commonly used in other countries is the aforementioned adsorption method (4) which employs activated carbon. Specific examples of the activated carbon adsorption method are disclosed in Japanese Unexamined Patent Publications Nos. 57-14687 and 57-42319 as well as in Japanese Examined Patent Publications Nos. 59-50715, 59-50716 and 2-46630. Compared to the earlier proposed absorption method (1) mentioned above, the activated carbon adsorption method is almost same as the absorption method in system configuration and is regarded as a technique which differs from the absorption method merely in that a process of absorbing gaseous hydrocarbons by the nonvolatile hydrocarbon solvent is replaced by an adsorption process using activated carbon. Accordingly, the aforementioned absorption method (1) can be regarded as a method in which a liquid adsorbent is used in a fluidized bed.

The aforementioned absorption method (1) has one drawback, however, in that the vacuum vessel must be depressurized to the degree of vacuum of about 3 mmHg to meet the United States EPA regulations, because the concentration of gaseous hydrocarbons remaining in air which is released into the atmosphere is determined uniquely by the degree of vacuum of the vacuum vessel.

However, a vacuum pump capable of processing waste gases at a rate of a few hundred cubic meters per hour at such a high vacuum is not presently available. It is therefore impossible to comply with the EPA regulations by the aforementioned absorption method (1).

On the other hand, the aforementioned adsorption method (4) can easily comply with the EPA regulations provided that means for removing enormous heat of adsorption generated when adsorbing gaseous hydrocarbons is perfect.

The heat of adsorption generated when gaseous hydrocarbons are adsorbed by use of activated carbon amounts to 10 to 15 kcal/mol, however. Waste gases released when loading a tank truck with gasoline amount to a few hundred cubic meters per hour, for example. An enormous amount of heat of adsorption would be generated if such waste gases whose gaseous hydrocarbon content is as high as 20 to 50 vol % are adsorbed by activated carbon.

If the means for removing this heat of adsorption is inadequate, the temperature of an activated carbon adsorption layer would rapidly increase, resulting in local heating and eventual firing or explosion. In fact, a number of such incidents have been reported in the past. The use of activated carbon makes such incidents even more dangerous since the activated carbon is a kind of adsorbent which is easily ignited. Another potential cause of these incidents is heat of polymerization generated when adsorbed heavy hydrocarbons are polymerized by a catalytic effect of an activated carbon adsorbent.

In these circumstances, a number of attempts have thus far been made to find out industrially viable means for removing enormous heat of adsorption when using the activated carbon adsorption method.

An example of prior art technology is to wind a coil for circulating cooling water around an activated carbon adsorption layer or to embed a coil within the activated carbon adsorption layer. These approaches would necessitate an enormous amount of cooling water, however, when a large amount of activated carbon is required.

This is because it is essential to maintain the internal temperature of the activated carbon adsorption layer to about 60° C. or less for the sake of safety, and it is possible use only the sensible heat of the cooling water. An extremely large amount of cooling water is required since the heat of adsorption generated in the activated carbon adsorption layer is by far greater than the amount of heat that can be carried away by the cooling water.

To provide means for solving this problem, Japanese Examined Patent Publication No. 59-50716 proposed a method of using "an organic liquid (e.g., liquid gasoline) which boils at a temperature lower than 100° C. close to room temperature" instead of water.

According to this method, it is possible to utilize the latent heat of vaporization of the organic liquid (e.g., liquid gasoline) and, therefore, the enormous heat of adsorption can be removed without requiring an unduly large amount of the organic liquid. This is because 1 kg of liquid gasoline, which is taken as an example for the purpose of explanation, removes nearly 100 kcal of latent heat when boiled. (Contrary to this, the sensible heat taken away by 1 kg of water is only 1 kcal/° C.).

With the development of this means, the problem of "how to remove the enormous heat of adsorption" has been solved. However, it has raised questions relating to the safety of the adsorption layer.

Particularly because activated carbon is a material which is easily ignited, new controversy has arisen as to whether it is right or wrong to pass such a hazardous combustible substance like gasoline through a coil embedded in the activated carbon adsorption layer.

To overcome the aforementioned problem of the activated carbon adsorption method, an alternative method has been proposed which employs, as means for treating a large amount of waste gases containing highly concentrated gaseous hydrocarbons, a combination of the adsorption method and the conventionally used absorption method or membrane gas separation method, rather than treating the waste gases by the adsorption method alone.

In this combination method, the concentration of gaseous hydrocarbons entering an activated carbon layer is limited to a low level by performing absorption operation or membrane gas separation operation prior to activated carbon adsorption operation, and as a consequence, it becomes possible to reduce the heat of adsorption generated in the activated carbon layer to a lowest possible level. If depressurized water whose boiling point is 80° C. or less is circulated as cooling water for removing the generated heat of adsorption, it also becomes possible to prevent a temperature increase due to local heating of the activated carbon layer and even out the temperature within the activated carbon layer.

Compared to the earlier-described prior art method which utilizes liquid gasoline in place of cooling water, this combination method is more safety-oriented as it provides means for achieving a uniform temperature distribution within the activated carbon layer while keeping the temperature to a low level.

This approach of combining the adsorption method with the absorption method or membrane gas separation method has drawbacks, however, in that such combination is somewhat uneconomical and overall process becomes complex.

Accordingly, it is an object of the invention to provide a method of treating gaseous hydrocarbons contained in waste gases which makes it possible to prevent abnormal temperature increase within each adsorbent layer, enhance the safety of adsorption apparatus and decrease the density of residual gaseous hydrocarbons in gases released into the atmosphere to 1 vol % or less.

Considering the above situations, the inventors carried out an intensive study and have completed the present invention.

SUMMARY OF THE INVENTION

The present invention provides a method of treating or recovering a gaseous hydrocarbon contained in waste gas employing a pair of adsorption apparatus which alternately performs adsorption and desorption processes, in which the waste gas containing the gaseous hydrocarbon is passed through one of the adsorption apparatus so that the gaseous hydrocarbon is adsorbed by adsorbent layers, enabling the adsorption apparatus to release the treated waste gas containing substantially no gaseous hydrocarbon.

While at the same time the other adsorption apparatus is switched to the desorption process, the gaseous hydrocarbon adsorbed by the adsorbent is drawn by a vacuum pump to separate the gaseous hydrocarbon from the adsorbent layers, and the gaseous hydrocarbon is recovered from separated outflow purge gas, the method being characterized in that:

(1) double-cylinder type or multi-cylinder type adsorption apparatus, in which each adsorbent layer is indirectly cooled by cooling water, are employed as the adsorption apparatus;

(2) each adsorbent layer is a packed layer of one or more kinds of materials selected from activated carbon, synthetic zeolites and hydrophobic silica gel;

(3) swing time required for switching between the adsorption and desorption steps is set to 1 to 15 minutes;

(4) each adsorbent layer is evacuated under vacuum while being purged by using part of clean gas evacuated from each adsorbent layer and/or air in the desorption process; and (5) the gaseous hydrocarbon is recovered from the outflow purge gas.

The invention also provides the method of treating or recovering the gaseous hydrocarbon contained in the waste gas, wherein the method comprises, as means for recovering the gaseous hydrocarbon from the waste gas which is used in the desorption process employing a combination of evacuation under vacuum and purging operation, the steps of:

1) causing the outflow purge gas of a completely dry type vacuum pump which is employed as the vacuum pump to be discharged upon increasing its gas pressure to 10 atmospheres, exceeding the normal atmospheric pressure; and 2) increasing the concentration of the gaseous hydrocarbon contained in the outflow purge gas by using as a cooling medium of the vacuum pump a liquid hydrocarbon of the same properties as the gaseous hydrocarbon contained in the waste gas and returning resultant gaseous hydrocarbon to an outlet pipe of a desorption apparatus, or by injecting the liquid or gaseous hydrocarbon of the same properties into the adsorption apparatus upon completion of the adsorption process to purge the apparatus and evacuating it under vacuum; and then accelerating liquefaction of the gaseous hydrocarbon by cooling it, or accelerating recovery of the gaseous hydrocarbon by an absorption method.

BRIEF DESCRIPTION OF THE DRAWINGS

FIGS. 2(A)–2(B) are diagrams illustrating practical examples of adsorption apparatus employed in this invention, in which FIG. 2(A) is a horizontal cross section of a double-cylinder type adsorption tower while FIG. 2(B) is a horizontal cross section of a multi-cylinder type adsorption tower.

MODES FOR CARRYING OUT THE INVENTION

Figure 1:
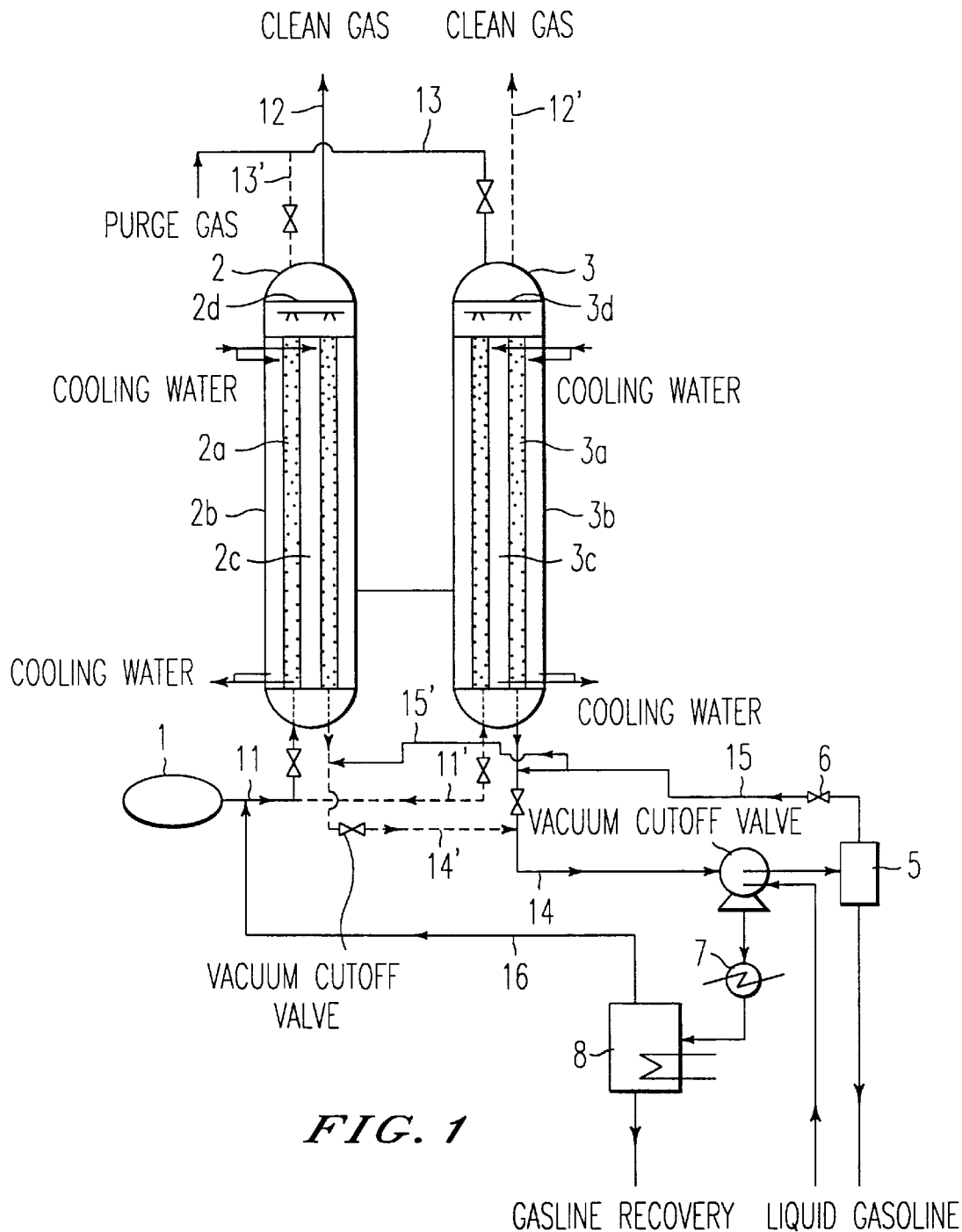
FIG. 1 is a diagram showing a flow sheet representing a method of treatment and recovery of gaseous hydrocarbons contained in waste gases according to an embodiment of the invention.

Although an adsorbent to be used in this invention is not limited to any specific type as long as it is formed of one or more kinds of materials selected from activated carbon, synthetic zeolites and hydrophobic silica gel, activated carbon is preferable because it has excellent adsorptivity and is easily and inexpensive obtainable. Granular activated carbon and fibrous activated carbon are typical examples of such activated carbon. Hydrophobic silica gel is not limited to any specific type. It is preferable to use commercially available silica gel which has been given hydrophobic properties by treating it with a chemical, such as trimethyl chlorosilane, or silica gel which has been made both hydrophobic and lipophilic by high-temperature treatment.

It is particularly preferable to use "silica gel having both hydrophobic and antistatic properties" which has been produced by immersing commercially available silica gel in a solution of a salt of electrically conductive metal (e.g., copper sulfate or zinc chloride) or of an antistatic agent (e.g., Stadis 450" manufactured by Du Pont), and then treating it in a temperature range of 250 to 500° C. This is because silica gel is liable to accumulate a static charge, and subsequent static buildup in the adsorbent, which can occur when treating waste gases containing gaseous hydrocarbons, gives rise to the risk of accidental ignition, burning or explosion.

It is preferable to use silica gel which has been heat-treated and given hydrophobic properties to prevent adsorption of water content (moisture) as described above in order that the silica gel would adsorb only gaseous hydrocarbons contained in waste gases.

The invention is not limited to the use of activated carbon or hydrophobic silica gel but is intended to embrace the use of other solid adsorbents such as synthetic zeolites or china clay having an affinity for gaseous hydrocarbons contained in waste gases.

Although the average diameter of adsorption pores of the aforementioned synthetic zeolites or hydrophobic silica gel is not specifically limited, it should preferably be between 4 and 100 angstroms. Methods usable for measuring the aforementioned average diameter of adsorption pores include, for instance, the mercury penetration method and nitrogen adsorption method (based on the BET equation and Kelvin equation and condensation). The aforementioned adsorbent may be charged in an adsorption tower in any of single-layer, multi-layer and mixed layer configurations.

When treating waste gases containing benzene in an adsorption tower of a two-layer configuration, for example, it is preferable to use hydrophobic silica gel in a first layer on the upstream side and load activated carbon in a second layer on the downstream side.

The aforementioned solid adsorbents, such as activated carbon, silica gel, synthetic zeolites and china clay, to be used in individual adsorbent layers have a strong affinity for gaseous hydrocarbons. These solid adsorbents are also used as thermal insulation materials.

Taking into consideration the foregoing points, the inventors carried out an intensive study and have solved the earlier-mentioned problems by employing as means for quickly carrying out and removing the heat of adsorption produced in each adsorbent layer therefrom a double-cylinder or multi-cylinder type adsorption apparatus, in which each adsorbent layer is cooled indirectly by cooling water (normal-pressure water or depressurized water).

According to the invention, it is possible to adsorb gaseous hydrocarbons from waste gases safely and efficiently by using an adsorption apparatus of the aforementioned structure even when combustible activated carbon is used.

Figure 2A:
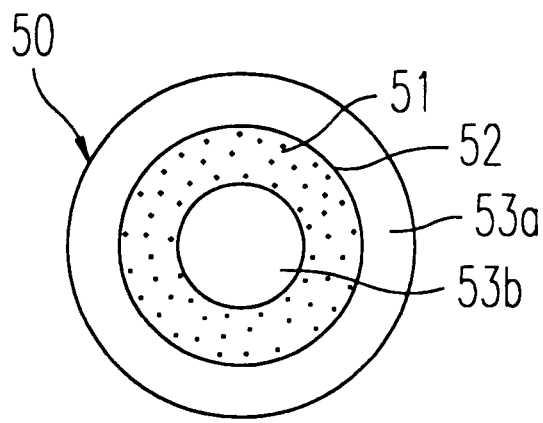
Figure 2B:
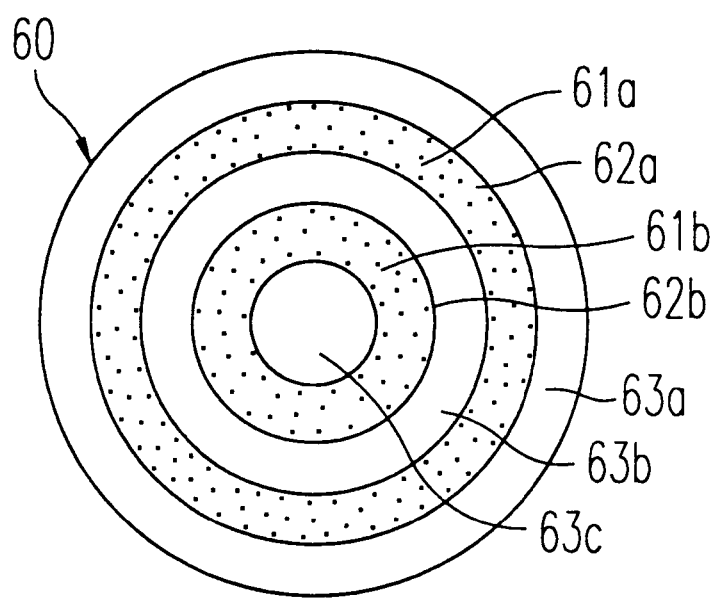

Examples of adsorption apparatus employed in this invention are now described with reference to FIGS. 2(A)–2(B), in which FIG. 2(A) is a horizontal cross section of a double-cylinder type adsorption tower, while FIG. 2(B) is a horizontal cross section of a multi-cylinder type adsorption tower.

An adsorption apparatus preferable in this invention is the double-cylinder type adsorption tower which is constructed in such a way that a cylinder 52 filled with adsorbent 51 and cooling water cylinders 53a, 53b for cooling a packed layer of the adsorbent 51 from both inside and outside are installed within an adsorption tower 50 as shown in FIG. 2(A). In a case where a large amount of adsorbent is used, it is possible to employ the multi-cylinder type adsorption tower which is constructed in such a way that cylinders 62a, 62b individually filled with adsorbent 61a, 61b and cooling water cylinders 63a, 63b and 63c for cooling packed layers of the adsorbent 61a, 61b from both inside and outside are installed within an adsorption tower 60 as shown in FIG. 2(B).

In either of the double-cylinder type adsorption tower 50 and the multi-cylinder type adsorption tower 60 mentioned above, cooling water is circulated at normal pressure or reduced pressure in a direction opposite to waste gas flows.

The cylinders for cooling and the cylinders filled with the adsorbent are placed adjacent to each other in order to increase the cooling efficiency, especially in the multi-cylinder type adsorption tower 60, considering the fact that the distance the heat of adsorption should travel until it reaches cooling water, or the thickness of each adsorbent layer, widely varies depending on the type and properties of the adsorbent.

Generally speaking, granular activated carbon packed to a thickness of about 4 inches (101.6 mm) or more can not convey the heat of adsorption up to a coolant layer in a short time, although actual heat transfer time depends on the particle diameter and temperature rise of the granular activated carbon.

Therefore, if granular activated carbon is packed to a thickness of 4 inches or more, heat transfer in circumferential directions does not contribute so much to cooling, and much of heat transfer is performed by gases flowing in a vertical direction. In this case, localized abnormal temperature increase may occur, resulting in occasional fires. In this invention, this problem is solved by adopting a multi-cylinder configuration in which such a thick layer of granular activated carbon is divided into multiple layers.

Fibrous activated carbon, which is also preferable in this invention, is in its raw form carbon fibers measuring about 10 micrometers in diameter. These carbon fibers may be shaped into various forms, such as felt fabric (unwoven fabric) form, sheetlike form and honeycomb form, for specific applications.

Fibrous activated carbon has a specific surface area of 1500 $m^2/g$ or more, providing a contact area approximately twice as large as that of granular activated carbon.

Thus, extremely high density of contact with gaseous hydrocarbons is achieved by the use of fibrous activated carbon. In other words, it provides a large adsorptive capacity against gaseous hydrocarbons. It also provides a remarkably high desorption rate because micropores are exposed on external surfaces of the carbon fibers. (The average diameter of pores of fibrous activated carbon is 20 to 30 angstroms, which is approximately one half that of granular activated carbon. A smaller average pore diameter is effective for reducing the amount of adsorption of heavy hydrocarbons which have a large molecular diameter and give adverse effects on adsorbents.)

More particularly, the amount of fibrous activated carbon required for treating a specific amount of gases is a few tenths of the amount of granular activated carbon to be used for treating the same amount of gases. Thus, fibrous activated carbon provides such advantageous effects that the distance the heat of adsorption should be moved (or the thickness of an activated carbon layer) can be reduced to a few tenths compared to granular activated carbon. A preferred mode for carrying out the invention is to use fibrous activated carbon, which is shaped into any of the aforementioned various forms, such as felt fabric (unwoven fabric) form, sheetlike form and honeycomb form, taking advantage of the above-stated effects.

Figure 3:
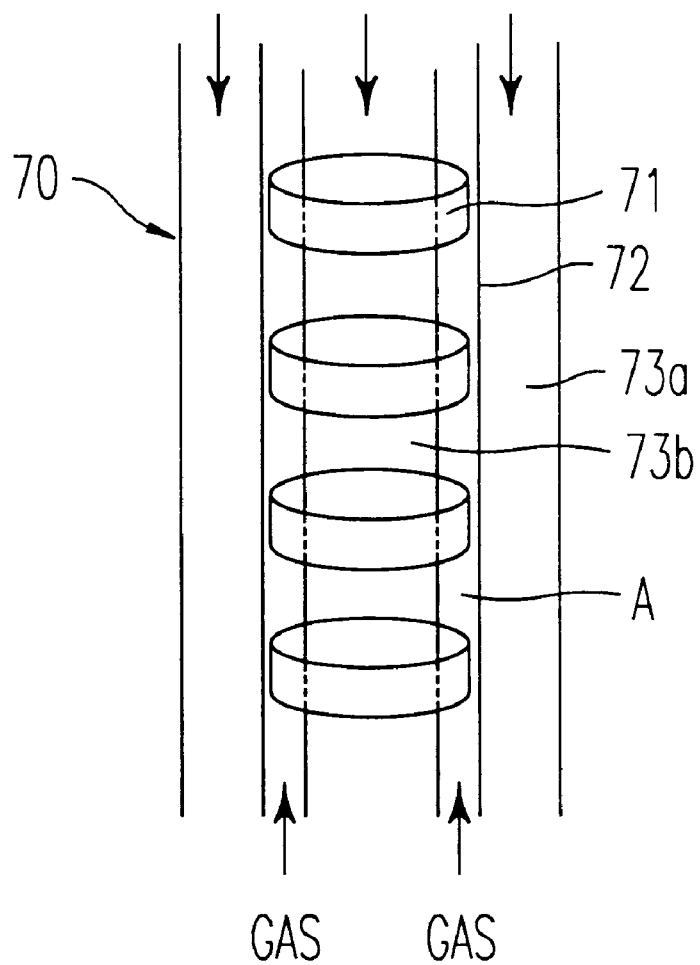
FIG. 3 is a schematic diagram illustrating an example of an adsorption tower in which fibrous activated carbon is used according to the invention.

Referring now to FIG. 3, a case where fibrous activated carbon is used in this invention is described. FIG. 3 is a schematic diagram illustrating an example of an adsorption tower in which fibrous activated carbon is used according to the invention.

In this invention, it is preferable to use a double-cylinder type adsorption tower 70 which is constructed in such a way that fibrous activated carbon disks 71, each produced by forming fibrous activated carbon into a disklike shape having a specified thickness, are arranged at specified intervals within an adsorbent packing cylinder 72 provided with cooling water cylinders 73a, 73b for cooling this cylinder 72 from both inside and outside, as shown in FIG. 3. It is possible to take advantage of excellent properties of the fibrous activated carbon by using the adsorption tower 70 of this construction. Letter A in FIG.3 indicates void spaces.

According to the invention, it is preferable to use the adsorption tower 50, 60 or 70 as shown in FIGS. 2(A), 2(B) and 3, respectively. By employing an adsorption tower in which cooling water and adsorbent layers are arranged in a "sandwich" configuration as described above, heat transfer to cooling water is speedily performed, making it possible to prevent heat buildup in the adsorbent layers caused by the heat of adsorption as well as local heating. As a consequence, operational safety is ensured even when combustible activated carbon is used.

When using a non-combustible adsorbent, such as synthetic zeolite or hydrophobic silica gel, in this invention, it is not necessary to take into account the risk of ignition or burning of the adsorbent itself due to its local heating, unlike the case of using the combustible activated carbon. It is therefore possible to set the thickness of each adsorbent layer to about 25 inches (635 mm) in this case if due consideration is given to the choice of a cooling medium and the method of cooling.

To provide a prevention method of accidental fires or explosions, the inventors have discovered a means to quickly remove the heat of adsorption by use of the latent heat of vaporization. This has been achieved by varying the thickness of each adsorbent layer (or the thickness of a double-layered cylinder) depending on the type and properties of the adsorbent used and by circulating cooling water at normal pressure or reduced pressure as described above.

To avoid the risk of generating the heat of adsorption, the time required for switching between adsorption and desorption processes (or the swing time) is set to such a short period of time as 1 to 15 minutes in this invention. While the swing time has conventionally been set within a range of 4 to 20 hours (Handbook of Chemical Engineering, Fourth Edition, published on Apr. 25, 1982), it is set to 1 to 15 minutes, preferably 3 to 10 minutes, and particularly preferably about 5 minutes, in this invention.

The swing time is set between 1 and 15 minutes in this invention in order to control the temperature of each adsorbent layer to a slightly higher level than the atmospheric temperature by limiting the amount of adsorption of gaseous hydrocarbons to suppress abnormal temperature increase due to the heat of adsorption and by quickly removing the heat generated in each adsorbent layer through the use of ordinary industrial water alone which is widely used for cooling.

The adsorption apparatus of this invention is switched in a short period of time as described above. A characteristic feature of the invention is that the apparatus is provided with combined means for "using vacuum while purging" when switched to a desorption process upon completion of an adsorption process, or when performing the desorption process.

Potential approaches to completing the desorption process in a short period of time comparable to short adsorption time would be to (a) increase the temperature of a desorption tower and use vacuum, (b) increase the amount of purge gas and use vacuum, or (c) employ both approaches.

If, however, the first approach of increasing the temperature of the desorption tower is employed, it becomes necessary to cool the adsorption tower when it has been switched to the adsorption process. Although this approach will not cause a major problem if steam is easily available, it is not economical to heat the desorption tower by electric heating.

Of course, it is not impossible to perform cooling and heating cycles in time intervals ranging from 1 to 15 minutes. Such operation will not ensure smooth heat transfer, however, and it remains uncertain whether a desired effect is achieved, although such a problem would not arise if the swing time is set between 30 minutes to a few hours as required under conventional operating conditions.

The present invention has been completed based on the finding that the shortened swing time of 1 to 15 minutes combined with the simultaneous use of "purge gas and vacuum" as desorption means is suited for treating and recovering gaseous hydrocarbons contained in waste gases in locations where steam is easily available, such as a gasoline storage site or a gasoline station to which the invention is particularly directed.

Another preferred method of performing the desorption process of this invention applicable to a case where gaseous hydrocarbons are separated from each adsorbent layer by sucking the adsorbed gaseous hydrocarbons by a vacuum pump is to use a completely dry type vacuum pump.

If the vacuum pump is a liquid ring vacuum pump and its sealing liquid is water, it is impossible to increase the degree of vacuum beyond the vapor pressure of water. In this case, it is necessary to use a gas ejector as disclosed in Japanese Unexamined Patent Publication No. 57-14687, because the commercially achievable degree of vacuum is limited to about 50 mmHg.

If the sealing liquid used is such a liquid as ethylene glycol which has no affinity with gaseous hydrocarbons but has an extremely low vapor pressure, a potential problem is formation of emulsion in a surface region that may occur when separating gaseous hydrocarbons from a discharged mixture of the sealing liquid and gaseous hydrocarbons. Furthermore, the sealing liquid thus separated needs to be cooled and recycled.

In the light of the foregoing, it is preferable to use a completely dry type vacuum pump, such as a "high-vacuum (maximum degree of vacuum 7 mmHg) and high-capacity (50 m3/min.) vacuum pump" manufactured by Hori Giken Kogyosha, rather than a liquid ring vacuum pump.

A characteristic feature of the method of the invention is that each adsorbent layer (desorption layer) is evacuated under vacuum while being purged in the desorption process and that part of clean gas evacuated from each adsorbent layer and/or air is used as auxiliary means during the process. This method employs vacuum evacuation as principal desorption means and uses air or other gas as auxiliary means for reducing the amount of purge gas compared to the conventional methods.

Methods of recovering gaseous hydrocarbons from outflow purge gas (output gas of the aforementioned completely dry type vacuum pump) of this invention are now described. Known examples of such methods include the following:

(1) A method in which the outflow purge gas is cooled until its gaseous hydrocarbon content is liquefied; and (2) A method in which the outflow purge gas is washed out with liquid hydrocarbons of the same properties so that the gaseous hydrocarbon content of the former is absorbed into the latter.

If, however, a large amount of purge gas is used when desorbing gaseous hydrocarbons which have been adsorbed by an adsorbent layer, the gaseous hydrocarbon content in the outflow purge gas may become lower than a specified level, causing a problem that gaseous hydrocarbons of such low concentration are neither liquefied nor absorbed in the aforementioned methods (1) and (2).

Such low-density gaseous hydrocarbons in the outflow purge gas would not easily reach the dew point. If it is intended to cool an outflow purge gas containing 12.95 vol % of n-pentane for liquefying the n-pentane content, for example, it should be noted that the dew point of the n-pentane content in the outflow purge gas is approximately $-15°$ C. This follows that condensation of n-pentane would not occur unless the outflow purge gas is cooled down to or below such a low temperature.

A problem is encountered with the aforementioned method (2) as well. If the vapor pressure of gaseous hydrocarbon components contained in the outflow purge gas is lower than the vapor pressure at normal temperature of the liquid hydrocarbons of the same properties used for washing, the gaseous hydrocarbon components would not be absorbed even when they are washed out with the liquid hydrocarbons. (Suppose that it is intended to wash a gaseous mixture of air and gasoline vapor with liquid gasoline, for example. If the vapor pressure of the gasoline vapor contained in the gaseous mixture is lower than the vapor pressure at normal temperature of the liquid gasoline, the gasoline vapor is not absorbed by the liquid gasoline even when the gaseous mixture is passed through the liquid gasoline.)

To efficiently recover the gaseous hydrocarbons by the aforementioned liquefaction method (1) or absorption method (2), the vapor pressure of the gaseous hydrocarbons in the outflow purge gas should normally be about 350 mmHg or more (45 vol % or more in terms of gaseous hydrocarbon content), preferably 50 vol % or more in density.

To provide a solution to this problem, the inventors have developed a novel method which comprises, in addition to the earlier-described "approach of employing vacuum evacuation as principal desorption means and using air or other gas as auxiliary means for reducing the amount of purge gas," a process including:

(A) causing the output gas (outflow purge gas) of the completely dry type vacuum pump to be discharged upon increasing its gas pressure to 10 atmospheres, exceeding the normal atmospheric pressure; and (B) increasing the density of gaseous hydrocarbons contained in the outflow purge gas by using as a cooling medium of the vacuum pump liquid hydrocarbons of the same properties as the gaseous hydrocarbons contained in the waste gas instead of usually used water or air and returning resultant hydrocarbon vapor to an outlet pipe of a desorption apparatus, or by injecting the liquid or gaseous hydrocarbons of the same properties into an adsorption apparatus upon completion of an adsorption process to purge the apparatus and evacuating it under vacuum;and then, accelerating liquefaction of the gaseous hydrocarbons by cooling them, or accelerating recovery of the gaseous hydrocarbons by the absorption method.

Operational effects obtained from the above innovative method of the invention are described taking the aforementioned "outflow purge gas containing 12.95 vol % of n-pentane" as an example, and with reference to the "case in which liquefaction of gaseous hydrocarbons is accelerated." n-pentane does not condense to its liquid state unless the outflow purge gas is cooled to about $-15°$ C. or below.

In contrast, if the density of n-pentane is increased to 25 vol % and the pressure of the output gas (outflow purge gas) is increased to 2 atmospheres, the dew point of the n-pentane content becomes approximately 18° C. so that n-pentane condenses to the liquid state at or below this temperature. This gas cooling temperature of 18° C. is an easily achievable level of temperature.

As can be seen from the foregoing, the gaseous hydrocarbons contained in the outflow purge gas can easily be liquefied by using (combining) the aforementioned treatments (A) and (B) in this invention, producing such operational effects that recovery of the gaseous hydrocarbons can be made in an efficient manner.

Now, the "case in which recovery is accelerated by the absorption method" is described. As already mentioned, a gaseous hydrocarbon content of 45 vol % or more is required to efficiently recover gaseous hydrocarbons by the absorption method, and it is impossible to efficiently recover them if the gaseous hydrocarbon content is less than 45 vol %. The aforementioned "liquid hydrocarbons of the same properties" include, in addition to a liquid hydrocarbon mixture containing the same constituents at the same concentrations, a liquid hydrocarbon mixture containing the same constituents at different concentrations as well as a liquid hydrocarbon mixture containing the same principal constituents at different concentrations.

According to the aforementioned novel method of the invention it is possible to increase the gaseous hydrocarbon content in the outflow purge gas, producing such operational effects that recovery by the absorption method is accelerated. (It is to be pointed out that the idea of "adding liquid hydrocarbons of the same properties as gaseous hydrocarbons contained in waste gases" has come from a paradoxical way of thinking, and is a completely new technological concept which can hardly be inferred from prior art technology.)

In this invention, the pressure of the output gas (outflow purge gas) of the vacuum pump is set to 10 atmospheres or less. Preferably, it should be set to 2 atmospheres or less from the viewpoint of power consumption. The reason why the aforementioned novel method includes the expression "exceeding the normal atmospheric pressure" is that this is an essential prerequisite for enabling the vacuum pump to discharge the outflow purge gas.

Now, the operation of "switching between adsorption and desorption processes" is described. As previously mentioned, a characteristic feature of the method of this invention is that each adsorbent layer is desorbed mainly by evacuating it under vacuum. When returning the state of reduced pressure created in this desorption process to the normal atmospheric pressure, it is preferable to use at least a specified amount of air.

This is because it is impossible to completely remove adsorbed gaseous hydrocarbons by the desorption method based mainly on evacuation under vacuum. At least the specified amount of air is used in order to completely desorb each adsorbent la vacuum. When returning the state of reduced pressure created in this desorption process to the normal atmospheric pressure, it is preferable to use at least a specified amount of air.

This is because it is impossible to completely remove adsorbed gaseous hydrocarbons by the desorption method based mainly on evacuation under vacuum. At least the specified amount of air is used in order to completely desorb each adsorbent layer and return it to its original state. Since gaseous hydrocarbons are contained in the air used, they are returned to the adsorption apparatus and mixed with waste gases for subsequent adsorption treatment.

The method of the invention is extremely effective as means for recovering multicomponent gas constituents from waste gases containing the same. As an example, the method is well suited for recovery of gasoline vapor from waste gases containing the same.

The invention is not limited in its application to the recovery of multicomponent gas constituents, however. It is also adapted to a method of recovering a single component, such as benzene, toluene or cyclohexane, from waste gases containing the same, for example. It is to be pointed out that there exists no effective means whose safety has ever been established that provides a method of recovering a single component from waste gases containing only the single component as mentioned above.

An example of embodiment of the method of the invention as a method of recovering a single component from waste gases containing that component is now described.

In the case of a single component system, it is desired that its component be recovered as a pure single component, unlike the case of a multicomponent system. For this reason, care should be taken when configuring a treatment facility to prevent contamination by other components. Specifically, it is preferable to configure an adsorption apparatus by arranging in it adsorbent layers and cooling water layers for cooling the adsorbent layers in the order of "a cooling water layer, an adsorbent layer for component A, a cooling water layer, and an adsorbent layer for component B" from outside to inside in the case of a tower type adsorption apparatus.

It is not desirable to use the aforementioned absorption recovery method (2) for recovering a single component from the waste gases discharged from the vacuum pump because a certain amount of the component will be left as a holdup within an absorption tower if that method is used. As a means for solving this problem, there may be provided a separate absorption tower for absorbing each component, or the internal space of the absorption tower may be divided.

On the other hand, if the "method of recovering the hydrocarbon content by cooling the outflow purge gas to condense the hydrocarbon content to the liquid state" of the invention is employed, there will be obtained such an advantageous effect that contamination by other components can be avoided by setting different cooling conditions for each individual component. Another advantageous effect of this cooling method is that it makes it possible to develop a transportable apparatus. Accordingly, it is preferable to employ the cooling method in this invention.

In carrying out this method, it is extremely effective for liquefying the outflow purge gas by cooling means to cause the out flow purge gas to be discharged from the vacuum pump upon increasing its pressure to 10 atmospheres, preferably to 2 atmospheres, exceeding the normal atmospheric pressure, before it is cooled, inject liquid hydrocarbons of the same properties into an adsorption tower immediately before an adsorption apparatus is switched to a desorption process upon completion of an adsorption process to purge the apparatus, and then evacuate it under vacuum.

In the method of the invention, it is possible to employ the conventionally known PSA method, PTSA method, VSA method or VTSA method within the scope of the invention.

PRACTICAL EXAMPLE

A practical example of carrying out the invention is now described with reference to FIG. 1, which is a flow sheet representing a method of treatment and recovery of gaseous hydrocarbons contained in waste gas according to an embodiment of the invention.

The present practical example is one example of a method of treating and recovering gaseous hydrocarbons contained in waste gas by using absorption towers 2 and 3 in which adsorbent loading cylinders 2a and 3a, depressurized water circulating outer cylinders 2b and 3b and inner cylinders 2c and 3c in which "depressurized cooling water" for cooling adsorbent layers from both inside and outside is circulated and sprinklers 2d and 3d are arranged, respectively, as shown in FIG. 1. In this practical example, granular activated carbon ("Ryujo Hakuro" manufactured by Takeda Chemical Industries, Ltd.) was used as an adsorbent.

The practical example is now described in detail referring to FIG. 1. The waste gas (waste gas containing approximately 40 vol % of gasoline vapor) produced by a waste gas source 1 is transferred by a blower (not shown) or by its own pressure to the adsorbent loading cylinder 2a (3a) within the absorption tower 2 (or 3) through a waste gas feeding pipe 11 (or 11').

Already treated waste gas which has gone through an adsorption process is released into the atmosphere as air containing 1 vol % of gasoline vapor or less (clean gas) from the top of the absorption tower 2 (absorption tower 3 after switching to a desorption process) through an outlet pipe 12 (or 12').

The absorption towers 2 and 3 are alternately switched between the aforementioned adsorption process and the later-described desorption process while they are operated. In this practical example, the swing time between the two processes was set to about 5 minutes.

The cooling water for cooling the adsorbent layers from both inside and outside was caused to form turbulent flows by means of baffle plates (not shown) installed within the depressurized water circulating outer cylinders 2b and 3b and inner cylinders 2c and 3c and flow in countercurrent with respect to the waste gas flowing within the adsorbent layers.

Upon completion of the adsorption process, the adsorbent layer within the absorption tower 2 (absorption tower 3 after switching to the desorption process) is desorbed by sucking it (evacuating it under vacuum) through an outflow purge gas drawing tube 14' (or outflow purge gas drawing tube 14) by using a completely dry type vacuum pump 4 (oscillating dry type vacuum pump manufactured by Hori Giken Kogyosha). During this operation. purge gas is introduced through a purge gas feeding pipe 13 (or purge gas feeding pipe 13') as auxiliary means.

Although not illustrated, part of the clean gas discharged from the tower top during adsorption operation was used as the aforementioned purge gas. The completely dry type vacuum pump 4 was operated at about 25 torr. Further, the output gas (outflow purge gas) of this vacuum pump 4 was caused to be discharged after pressurizing it to nearly 2 atmospheres.

Liquid gasoline is used as a coolant for the vacuum pump 4, and liquid gasoline containing evaporated gasoline vapor produced by heat exchange with the outflow purge gas containing gasoline vapor is separated into gasoline vapor and liquid gasoline by a gas-liquid separator 5.

The evaporated gasoline vapor is returned to the outflow purge gas drawing tube 14 and 14' (on upstream side of each vacuum cutoff valve in a closed state) which connect the absorption towers 2 and 3 and the vacuum pump 4 by way of an orifice valve 6 and gasoline vapor feeding pipes 15 and 15' for executing purging operation. This increases the density of gasoline vapor within the outflow purge gas. Hydrocarbons driven out by the purging operation are returned to an intake port (not shown) of the original absorption tower.

Upon completion of the above operation, each vacuum cutoff valve is set to an open position and the concentration of gasoline vapor contained in the outflow purge gas discharged after desorption is increased by the aforementioned operation is sent to a gasoline recovery unit 8 by way of the vacuum pump 4 and a cooling unit 7.

The cooling unit 7 and the gasoline recovery unit 8 use Freon as a coolant. Gaseous hydrocarbons are condensed by the recovery unit 8, whereby the gasoline vapor contained in the outflow purge gas is recovered in the form of liquid gasoline.

Since some gasoline vapor exists in that portion of the waste gas which has not been condensed by the gasoline recovery unit 8, the remaining waste gas is returned to the waste gas feeding pipe 11 via a feedback pipe 16 and mixed with the waste gas fed from the waste gas source 1 to undergo further adsorption operation.

The sprinklers 2d and 3d are provided for ensuring the safety of operation. Should a state of emergency occur in the adsorbent layers, they are automatically activated upon detecting a temperature anomaly or smoke and inject water into the respective adsorbent layers. In one variation, nitrogen gas may be introduced instead of water.

Since the swing time between the adsorption and desorption processes is as short as about 5 minutes in this practical example as described earlier, the amount of gaseous hydrocarbons that are adsorbed does not exceed about 2%. Furthermore, the cooling means for removing heat buildup in the adsorbent layers is constructed by using an innovative design. As a consequence, local heating was prevented and the adsorbent layers was maintained almost at room temperature throughout the whole duration of operation.

The density of the gasoline vapor contained in the gas released into the atmosphere through the outlet pipes 12 and 12' was substantially 0 vol %.

The present invention is not limited to the foregoing practical example but may be modified and varied in various forms within the scope of invention.

As an example, although the low-temperature liquefaction method involving the use of the cooling unit 7 was employed as a gasoline vapor recovery method in the above-described practical example, it is possible to employ the absorption method instead. Alternatively, although the gasoline vapor evaporated from the coolant (liquid gasoline) of the vacuum pump 4 as the means for increasing the density of gasoline vapor within the outflow purge gas, liquid gasoline itself may be separately injected into the absorption tower 2 (or absorption tower 3) upon completion of an adsorption process before running the vacuum pump 4 for executing purging operation. The invention is intended to embrace all such alternatives.

INDUSTRIAL APPLICABILITY

According to the invention, it is possible to treat gaseous hydrocarbons contained in waste gases to decrease the residual hydrocarbon content in "clean gas" released into the atmosphere to 1 vol % or less, control the amount of adsorbed gaseous hydrocarbons relative to the amount of the adsorbent to a low level, prevent abnormal temperature increase within the adsorbent layers to achieve uniform temperature distribution in the adsorption apparatus, and thereby provide maximum operating safety of the adsorption apparatus, regardless of the density of the gaseous hydrocarbons.

Furthermore, it has been proved that the invention makes it possible to not only fully comply with "the criterion of 1 vol % or less set by the United States Environmental Protection Agency (EPA)" regarding the treatment of air polluting gaseous hydrocarbons which could hardly be achieved by the absorption method or membrane gas separation method conventionally employed in Japan, but also sufficiently cope with the newly announced EPA policy of enforcing even more stringent regulatory standards which would lower the criterion to half the current level.

What is claimed is:

1. A method of treating or recovering a gaseous hydrocarbon contained in waste gas employing a pair of adsorption apparatus which alternately performs adsorption and desorption processes, in which the waste gas containing the gaseous hydrocarbon is passed through one of the adsorption apparatus so that the gaseous hydrocarbon is adsorbed by adsorbent layers, enabling the adsorption apparatus to release the treated waste gas containing substantially no gaseous hydrocarbon, while at the same time the other adsorption apparatus is switched to the desorption process, the gaseous hydrocarbon adsorbed by the adsorbent is drawn by a vacuum pump to separate the gaseous hydrocarbon from said adsorbent layers, and the gaseous hydrocarbon is recovered from separated outflow purge gas, said method being characterized in that:

(1) double-cylinder or multi-cylinder adsorption apparatus, in which each adsorbent layer is indirectly cooled by cooling water, are employed as said adsorption apparatus;

(2) adsorbent layers include a first layer employing the hydrophobic silica gel placed on an upstream side and a second layer employing the activated carbon placed on a downstream side as said adsorbent layers;

(3) swing time required for switching between the adsorption and desorption processes is set to 1 to 15 minutes;

(4) each adsorbent layer is evacuated under vacuum while being purged by using part of clean gas evacuated from each adsorbent layer and/or air in the desorption process; and (5) the gaseous hydrocarbon is recovered from the outflow purge gas.

2. A method of treating or recovering the gaseous hydrocarbon contained in the waste gas as defined in claim 1, which is characterized in that the density of the gaseous hydrocarbon contained in the waste gas released from said adsorbent layers into the atmosphere is lowered to 1 vol % or less.

3. A method of treating or recovering a gaseous hydrocarbon contained in waste gas employing a pair of adsorption apparatus which alternately performs adsorption and desorption processes, in which the waste gas containing the gaseous hydrocarbon is passed through one of the adsorption apparatus so that the gaseous hydrocarbon is adsorbed by adsorbent layers, enabling the adsorption apparatus to release the treated waste gas containing substantially no gaseous hydrocarbon, while at the same time the other adsorption apparatus is switched to the desorption process, the gaseous hydrocarbon adsorbed by the adsorbent is drawn by a vacuum pump to separate the gaseous hydrocarbon from said adsorbent layers, and the gaseous hydrocarbon is recovered from separated outflow purge gas, said method being characterized in that:

(1) double-cylinder or multi-cylinder adsorption apparatus, in which each adsorbent layer is indirectly cooled by cooling water, are employed as said adsorption apparatus;

(2) each adsorbent layer is a packed layer of one or more kinds of materials selected from activated carbon, synthetic zeolites and hydrophobic silica gel;

(3) swing time required for switching between the adsorption and desorption processes is set to 1 to 15 minutes, and (4) each adsorbent layer is evacuated under vacuum while being purged by using part of clean gas evacuated from each adsorbent layer and/or air in the desorption process; and (5) the gaseous hydrocarbon is recovered from the outflow purge gas, and as means for recovering the gaseous hydrocarbon from the waste gas which is used in the desorption process employing a combination of evacuation under vacuum and purging operation, the steps of:

1) causing the outflow purge gas of a completely dry vacuum pump which is employed as said vacuum pump to be discharged upon increasing its gas pressure to 10 atmospheres, exceeding the normal atmospheric pressure; and 2) increasing the density of the gaseous hydrocarbon contained in the outflow purge gas by using as a cooling medium of the vacuum pump a liquid hydrocarbon of the same properties as the gaseous hydrocarbon contained in the waste gas and returning resultant gaseous hydrocarbon to an outlet pipe of a desorption apparatus, or by injecting the liquid or gaseous hydrocarbon of the same properties into the adsorption apparatus upon completion of the adsorption process to purge the apparatus and evacuating it under vacuum; and then accelerating liquefaction of the gaseous hydrocarbon by cooling it, or accelerating recovery of the gaseous hydrocarbon by an absorption method.

4. A method of treating or recovering the gaseous hydrocarbon contained in the waste gas as defined in claim 3 which is characterized in that a portion of the waste gas which has not been condensed in the step of liquefaction by condensation of the outflow purge gas is returned to an intake port of the absorption apparatus.

5. A method of treating or recovering the gaseous hydrocarbon contained in the waste gas as defined in claim 4, wherein the density of the gaseous hydrocarbon contained in the waste gas released from said adsorbent layers into the atmosphere is lowered to 1 vol % or less.

6. A method of treating or recovering the gaseous hydrocarbon contained in the waste gas as defined in claim 3, wherein the density of the gaseous hydrocarbon contained in the waste gas released from said adsorbent layers into the atmosphere is lowered to 1 vol % or less.

7. A method of treating or recovering a gaseous hydrocarbon contained in waste gas employing a pair of adsorption apparatus which alternately performs adsorption and desorption processes, in which the waste gas containing the gaseous hydrocarbon is passed through one of the adsorption apparatus so that the gaseous hydrocarbon is adsorbed by adsorbent layers, enabling the adsorption apparatus to release the treated waste gas containing substantially no gaseous hydrocarbon, while at the same time the other adsorption apparatus is switched to the desorption process, the gaseous hydrocarbon adsorbed by the adsorbent is drawn by a vacuum pump to separate the gaseous hydrocarbon from said adsorbent layers, and the gaseous hydrocarbon is recovered from separated outflow purge gas, said method being characterized in that:

(1) double-cylinder or multi-cylinder adsorption apparatus, in which each adsorbent layer is indirectly cooled by cooling water, are employed as said adsorption apparatus;

(2) each adsorbent layer is a packed layer of one or more kinds of materials selected from activated carbon, synthetic zeolites and hydrophobic silica gel;

(3) swing time required for switching between the adsorption and desorption processes is set to 1 to 15 minutes, and at least a specified amount of air is used when the state of reduced pressure created in the desorption process is returned to the normal atmospheric pressure when switching between the adsorption and desorption processes, and (4) each adsorbent layer is evacuated under vacuum while being purged by using part of clean gas evacuated from each adsorbent layer and/or air in the desorption process; and (5) the gaseous hydrocarbon is recovered from the outflow purge gas.

8. A method of treating or recovering the gaseous hydrocarbon contained in the waste gas as defined in claim 7, wherein the density of the gaseous hydrocarbon contained in the waste gas released from said adsorbent layers into the atmosphere is lowered to 1 vol % or less.

* * * * *

UNITED STATES PATENT AND TRADEMARK OFFICE
CERTIFICATE OF CORRECTION

PATENT NO. : 6,066,192

DATED : May 23, 2000

INVENTOR(S): Toshinaga KAWAI et al.

It is certified that an error appears in the above-identified patent and that said Letters Patent is hereby corrected as shown below:

On the title page, item [75], the Inventors' names have been transposed, and the 3rd Inventor's name is spelled incorrectly. Item [75] should read as follows:

--[75] Inventors: Toshinaga Kawai, Yokohama-shi; Hiroshi Tahara, Kawasaki-shi; Kenichiro Suzuki, Sayama-shi, all of Japan ---

Signed and Sealed this

Twenty-fourth Day of April, 2001

Attest:

NICHOLAS P. GODICI

Attesting Officer     Acting Director of the United States Patent and Trademark Office